(No Model.)

G. H. SMITH.
DIE FOR MAKING ENGINE SPRING ENDS.

No. 416,017. Patented Nov. 26, 1889.

Witnesses,
J. H. Krause
H. C. Lee

Inventor,
George H. Smith
By Dewey & Co.
Attys

UNITED STATES PATENT OFFICE.

GEORGE H. SMITH, OF SACRAMENTO, CALIFORNIA.

DIE FOR MAKING ENGINE-SPRING ENDS.

SPECIFICATION forming part of Letters Patent No. 416,017, dated November 26, 1889.

Application filed July 23, 1889. Serial No. 318,413. (No model.)

*To all whom it may concern:*

Be it known that I, GEORGE H. SMITH, of Sacramento, Sacramento county, State of California, have invented an Improvement in the Manufacture of Engine-Spring Ends; and I hereby declare the following to be a full, clear, and exact description of the same.

My invention relates to the making of the ends of locomotive-engine springs, so as to connect them with what are known as "the spring-hangers."

It consists in means for forming suitable lugs and welding them upon the ends of the back or main leaf and in shaping and slotting these ends, as will be more fully explained by reference to the accompanying drawings, in which—

Figure 1:
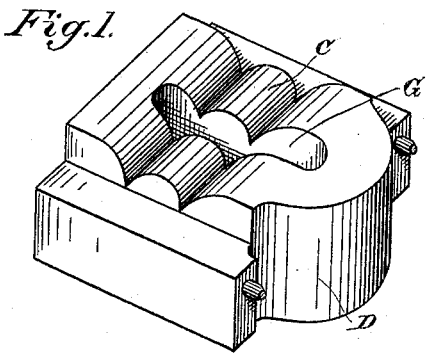
Figure 2:
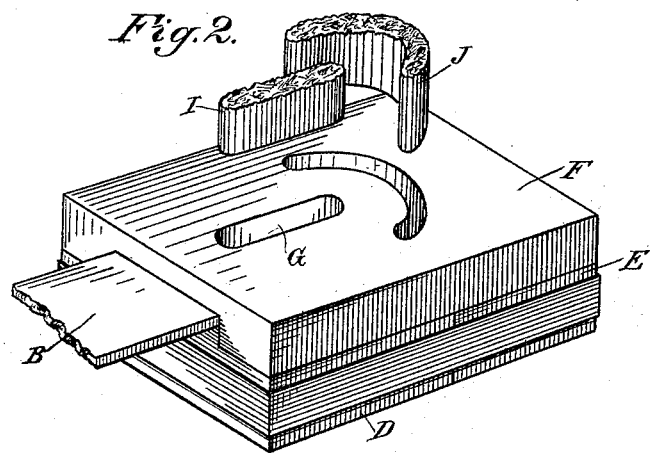
Figure 3:
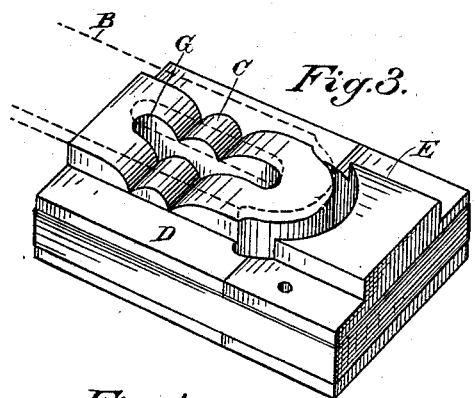
Figure 4:
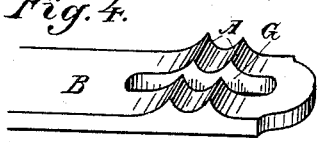

Figure 1 is a view of the die for forming and welding the lug. Fig. 2 is an exterior view of the die and punches for shaping and slotting the spring end. Fig. 3 is a view of the face of the shaping and slotting die with the cap removed. Fig. 4 is a view of the spring end as slotted and completed.

The long or first leaf of the spring is called the "main" or "back" leaf, and in order to connect two or more pairs of springs with equalizing-levers, so as to distribute the strain through both springs, it is necessary to connect the springs with the equalizing-levers by means of links, and in order to retain the links in place and prevent their slipping upon the spring the ends of the main leaves of the springs are provided with lugs which engage the links and hold them in place. These ends are of three kinds, two of them having half-round or concave bearings, one being solid and the other slotted, and the third being what is known as a "flat bearing." My invention is designed to form these ends.

A is the lug or die, which is formed and welded upon the end of the spring-leaf B by means of the die C, which is operated either by a drop or hydraulic or other press, so that when the end of the spring, with the lug attached to it, has been properly heated and placed in the die beneath the hammer, a single blow will weld them together.

The slotting and finishing die is formed in three parts D, E, and F. The part D is made with a convex-curved corrugated surface of the same shape as the spring end and the lug which has been welded thereto, so that the end of the spring may be laid upon this surface, the lug exactly fitting the corrugated portions. Through the center of this surface the slot G is made, as shown. The part E of the die is secured to the part D by means of an iron strap, which is shrunk or otherwise secured around them, thus holding them together. The end of the part D of the die is rounded, as shown, and the part E is made correspondingly concave, so that when the two parts of the die are put together, a semicircular slot extends vertically through the die. The cap-piece F of the die fits over the parts D and E and holds the end of the spring, with its lug, properly in place upon the surface of the die D. This cap-piece has slots in it corresponding with those in the parts D and E, adapted to receive the punches I and J, which are similarly shaped. These punches being forced down through the slots previously described will form the slot G in the end of the spring and its lug, and will also form or shape the end of the spring to any desired finish, this work being done with a single blow or pressure from the hammer or press.

If it is necessary to dress up the parts of the die, the band holding the parts together may be removed and again replaced after the dressing is completed. By this means I am enabled to weld on the lugs and finish up the ends of the spring-leaves in a symmetrical manner and with great rapidity.

Having thus described my invention, what I claim as new, and desire to secure by Letters Patent, is—

1. A device for forming spring ends, consisting of a channeled die having the transverse corrugated depressions and a corresponding cap-piece fitting the die, substantially as herein described.

2. The die having the convex corrugated surfaces, and the slots formed vertically through it, the slotted cap-piece fitting said die, and the punches fitted to pass through the slots, substantially as described.

3. The die comprising the two parts, having the vertical slots and the surface adapted to receive the end of the spring, with the lug attached thereto, the cap-piece having the slots corresponding with those in the face of the die, and punches fitting said slots, substantially as described In witness whereof I have hereunto set my hand.

GEORGE H. SMITH.

Witnesses:
    JAS. N. PORTER,
    J. W. SHEPHERD.